United States Patent [19]

Wise et al.

[11] 4,444,077
[45] Apr. 24, 1984

[54] FLYING SAW APPARATUS

[75] Inventors: Robert J. Wise, Eugene; James P. Petermann, Beaverton, both of Oreg.

[73] Assignee: Georgia-Pacific Corporation, Atlanta, Ga.

[21] Appl. No.: 305,715

[22] Filed: Sep. 25, 1981

[51] Int. Cl.³ .......................... B27B 5/06; B23D 45/18
[52] U.S. Cl. ........................................ 83/319; 83/285; 83/294; 83/310
[58] Field of Search ................. 83/318, 319, 320, 285, 83/289, 290, 294, 310

[56] References Cited

U.S. PATENT DOCUMENTS

| | | | |
|---|---|---|---|
| 1,924,162 | 3/1933 | Mason | 164/68 |
| 2,086,374 | 7/1937 | Wikle et al. | 164/73 |
| 2,159,282 | 5/1939 | Marino | 143/47 |
| 2,605,841 | 8/1952 | Overman | 164/76 |
| 2,610,688 | 9/1952 | Overman | 164/76 |
| 2,682,307 | 6/1954 | Overman | 164/76 |
| 3,072,004 | 1/1963 | Jenkins | 83/318 |
| 3,081,657 | 3/1963 | Harris | 83/294 |
| 3,133,850 | 5/1964 | Alenius | 156/558 |
| 3,174,373 | 3/1965 | Gensman | 83/110 |
| 3,190,162 | 6/1965 | Sonneland | 83/285 |
| 3,288,011 | 11/1966 | Borzym | 83/310 |
| 3,354,765 | 11/1967 | Frey et al. | 83/71 |
| 3,373,642 | 3/1968 | Simpson | 83/76 |
| 3,415,150 | 12/1968 | Krueger | 83/319 |
| 3,608,594 | 9/1971 | Heiderried | 143/47 G |
| 3,620,887 | 11/1971 | Nelson | 156/563 |
| 3,704,643 | 12/1972 | Cookson | 83/294 |
| 3,738,215 | 6/1973 | Craig et al. | 83/289 |
| 3,811,354 | 5/1974 | Ito | 83/320 |
| 3,945,284 | 3/1976 | Wetzels et al. | 83/290 |
| 4,030,393 | 6/1977 | Steiner | 83/318 |
| 4,175,455 | 11/1979 | Genis et al. | 83/110 |

Primary Examiner—Donald R. Schran
Attorney, Agent, or Firm—Banner, Birch, McKie & Beckett

[57] ABSTRACT

A flying saw apparatus for severing a predetermined length of material from a continuously moving length of material is disclosed. A saw carriage is supported on a main frame assembly for reciprocating motion parallel to the direction of motion of the material. The saw carriage includes a saw bridge which extends transversely of the direction of motion of the saw carriage and is movable upwardly and downwardly. A saw shuttle, which carries a circular saw, is supported for reciprocating motion on the saw bridge. The saw carriage is connected through a drive mechanism to the main power drive of the material conveyor preceding the flying saw apparatus. The reciprocating motion of the saw carriage is transferred to reciprocating transverse motion of the saw shuttle by a rack and pinion mechanism.

30 Claims, 13 Drawing Figures

FLYING SAW APPARATUS

TECHNICAL FIELD

The present invention relates to an apparatus for severing a desired length of material from a moving continuous length of material. The present invention is preferably used to sever a predetermined length of a wood composition, such as plywood, from a moving continuous length of wood composition. The severing action is accomplished by a saw which moves transversely of the direction of motion of the material, while also moving concurrently with the material.

BACKGROUND OF THE INVENTION

Numerous types of apparatus have been used in the past to sever desired lengths of material from a moving continuous length of material. Two types of prior art devices are flying shears and flying saws.

Flying shears utilize shear blade assemblies which have a width equal to the width of the material to be cut. The cutting operation is thereby accomplished by a single passing or shearing motion downward through the entire width of material. Examples of flying shears are found in U.S. Pat. Nos. 3,704,643 and 3,811,354.

Flying saws utilize cutting blades, generally circular rotary driven blades, which have a size smaller than the width of the material to be severed. Thus, in a flying saw, the saw blade must be moved transversely across the width of the material to be severed. Examples of flying saws are found in U.S. Pat. Nos. 1,924,162; 3,133,850; 3,190,162 and 3,620,887.

The flying saw disclosed in the U.S. Pat. No. 1,924,162 patent is adapted for cutting a sheet of fiberous composition, particularly a sheet of material from a forming machine, such as a Fourdinier machine. A main carriage is driven parallel to the direction of motion of the material by coupling the main carriage to an endless chain which in turn is connected to the main drive of the material to be cut. See FIG. 2 of the '162 patent. The main carriage includes a pair of tracks extending transversely of the direction of motion of the material. A saw supporting carriage is supported for transverse motion on the tracks. A motor driven saw is carried on the saw supporting carriage. The transverse motion of the saw is accomplished by the pulling action of two cables. One of the cables has one of its ends connected to one of the sides of the saw supporting carriage and its other end connected to a main support frame, and the other cable has one of its ends connected to the other side of the saw supporting carriage and its other end connected to the main support frame. As the main carriage is moved longitudinally, the saw support carriage is thereby moved transversely by the pulling action of the cable.

The '850 patent discloses a process for manufacturing plywood, including a saw device for cutting a continuous length of plywood into separate pieces. The saw device is clamped to moving plywood so that the saw device moves concurrently with the plywood. The clamping action is initiated by a limit switch. The limit switch also activates a motor which drives a circular saw transversely of the plywood. The saw device is moved in a direction opposite to the motion of the plywood by a pneumatic cylinder which is activated after the saw device is unclamped from the plywood. A subsequent cut by the circular saw is thereafter accomplished in an opposite transverse direction.

The '887 patent discloses a method and apparatus for manufacturing plywood including a cut off unit for cutting separate sections of plywood from a moving continuous length of plywood. The apparatus includes a carriage which is driven in the direction of motion of the plywood to be cut by spaced endless chains connected to the carriage by links. The endless chains are driven by a common drive motor. A subcarriage is carried on the main carriage and is movable transversely of the direction of motion of the carriage. An endless chain, driven by a separate electric motor, provides the power to move the subcarriage transversely. The carriage and subcarriage are mounted below the plywood to be cut and a circular blade projects upwardly through the plywood as it is cut. A photo cell actuates the cut off unit by initiating the clamping of the plywood and the drive of the drive motors for the main carriage and subcarriage. The sawdust produced during the cutting operation is drawn away by a vacuum dust. After the completion of one transverse cut, the endless chain coupled to the main carriage moves the carriage back to its initiation point. When the photo cell indicates the initiation of another cutting operation, the cycle begins again, with the subcarriage moving transversely in the opposite direction to the preceeding cut.

Figure 3:
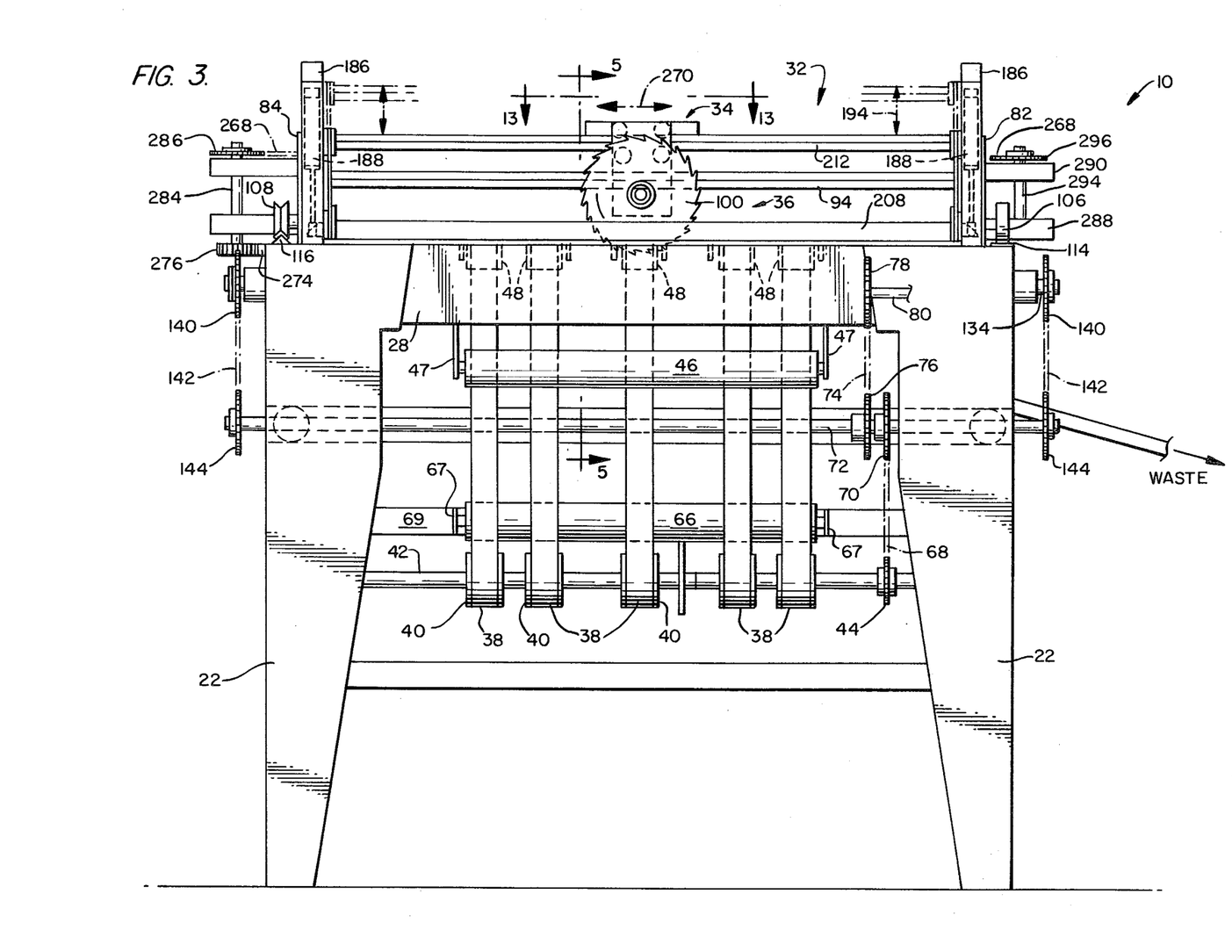
FIG. 3 is an end view of the flying saw apparatus, taken from the inlet end.
Figure 4:
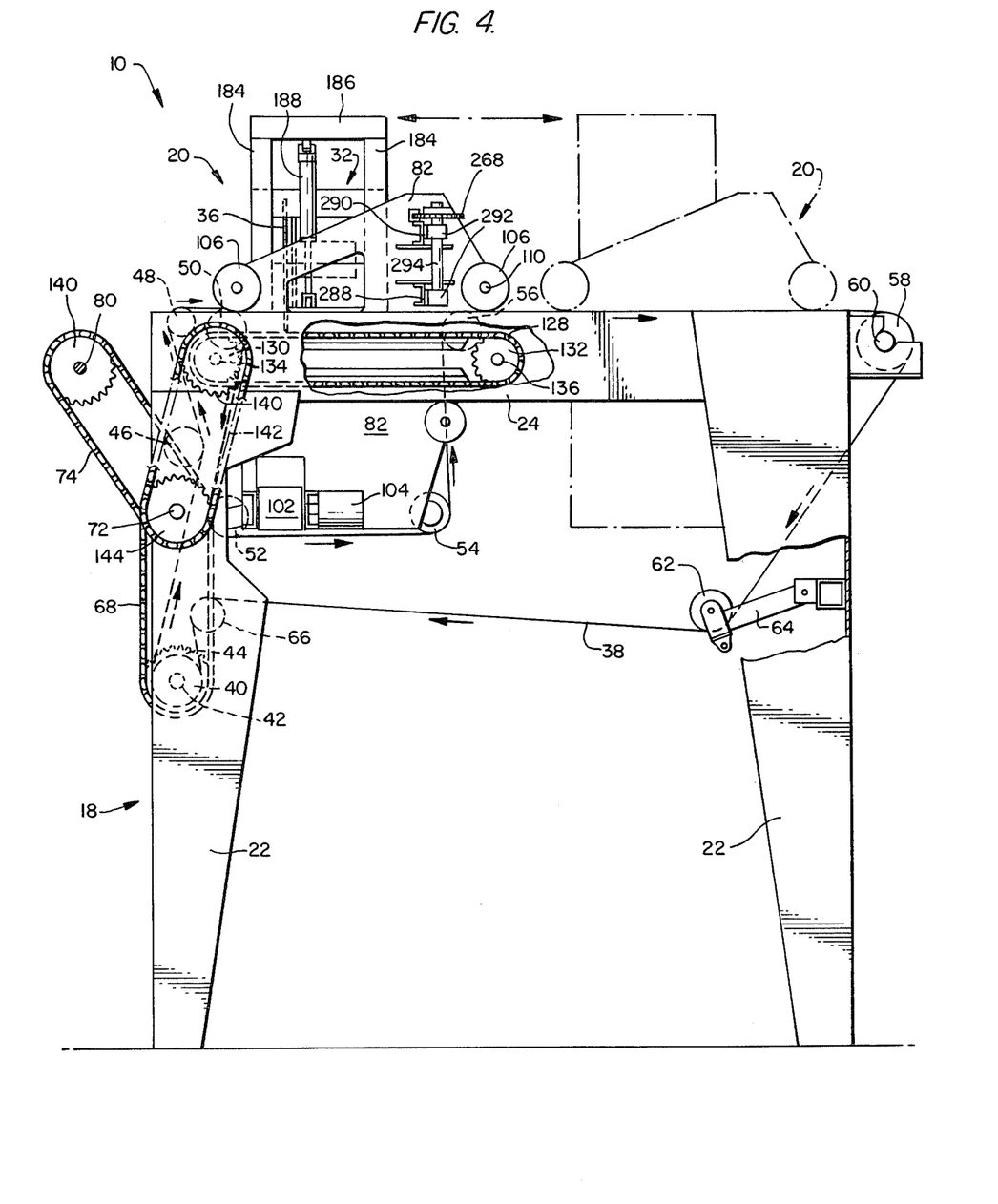
FIG. 4 is a side view of the flying saw apparatus.

The 3,190,162 patent discloses a cut off machine wherein a saw is moved transversely through the material to be cut, such as rods passing from a casting machine. A clamp mechanism for holding the material being cut is activated by a rack and pinion, as illustrated in FIGS. 3 and 4.

Numerous problems have occurred with commercial prior art flying saws. For example, if the device uses an electric saw motor beneath the material being cut, the saw operates in an extremely dusty environment thereby causing excessive electrical problems. If the saw makes its cut in both directions, dust is thrown above the material, as well as below the material, thereby requiring an air pick up to collect the dust. When electrical signals are used to control the starting and stopping of saw travel, miscuts may occur. If saw travel is accomplished by air cylinders, the air cylinder operates at maximum capacity and speed at all times and is therefore prone to break down and high maintenance costs.

SUMMARY OF THE INVENTION

The present invention is directed to a flying saw apparatus for severing a predetermined length of material from a continuously moving length of the material. The flying saw apparatus includes a main frame assembly. A saw carriage, including a saw bridge extending transversely of the direction of motion of the material, is supported by the main frame assembly for reciprocating motion parallel to the direction of motion of the material to be severed. A saw shuttle is connected to the saw bridge for reciprocating motion transverse to the direction of motion of the saw carriage. A saw is carried by the saw shuttle. A carriage drive mechanism drives the saw carriage in its reciprocating motion. The carriage drive mechanism is coupled to the drive mechanism of the moving length of material to coordinate the motion of the length of material to the motion of the saw carriage. A shuttle drive mechanism moves the saw shuttle in its reciprocating motion. The shuttle drive mechanism includes a fixed rack extending in the direction of motion of the saw carriage, a pinion rotatably carried by the saw carriage in meshing engagement with the rack, and a mechanism drivingly connecting the pinion to the saw shuttle whereby the reciprocal motion of the saw carriage is transferred into reciprocal motion of the saw shuttle along the length of the saw bridge.

In a preferred embodiment, the saw bridge includes at least one material hold down bar extending transversely. The hold down bar clamps down upon the material to be cut adjacent the path of the saw. An actuator mechanism moves the saw bridge, including the material hold down bar and the saw, in unison upwardly and downwardly into and out of clamping engagement with the material. The carriage drive mechanism is preferably an endless chain coupled to the saw carriage. This endless chain is driven by the power of the material conveyor preceding the flying saw apparatus. The mechanism drivingly connecting the pinion to the saw shuttle is preferably a second endless chain trained about pulleys on opposite transverse sides of the saw carriage.

The saw motor is located above the material to be cut and is preferably hydraulically driven. The upward and downward motion of the saw bridge is preferably accomplished by hydraulic piston-cylinders on either transverse side of the saw carriage.

Since the hydraulic saw motor is located above the material being cut, it operates in a cleaner environment. The cutting operation of the saw occurs in only one transverse direction whereby the saw teeth go downward through the material. All the dust is thus cast downward into a waste conveyor. The longitudinal and transverse travel of the saw is accomplished in an accurate manner which is coordinated with the drive of the material being cut by means of the two endless chains interconnected through the rack and pinion. A reliable, inexpensive drive mechanism for longitudinal and transverse motion is thus provided. The clamping operation and initiation of the cutting operation are accomplished in an accurate and simple manner by moving the clamping bars and the saw in unison.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

DETAILED DESCRIPTION OF THE INVENTION

Figure 1:
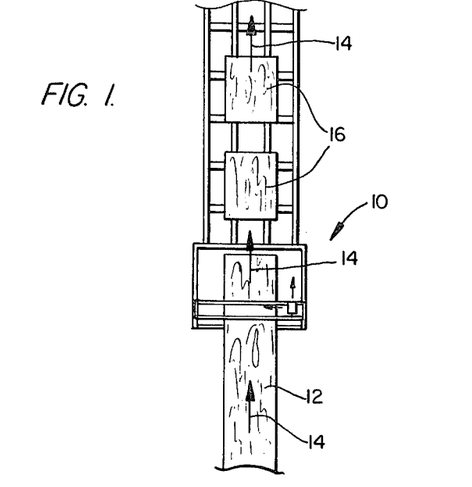
FIG. 1 is a top plan view illustrating a moving length of material entering and exiting a flying saw apparatus in accordance with the present invention.
Figure 2:
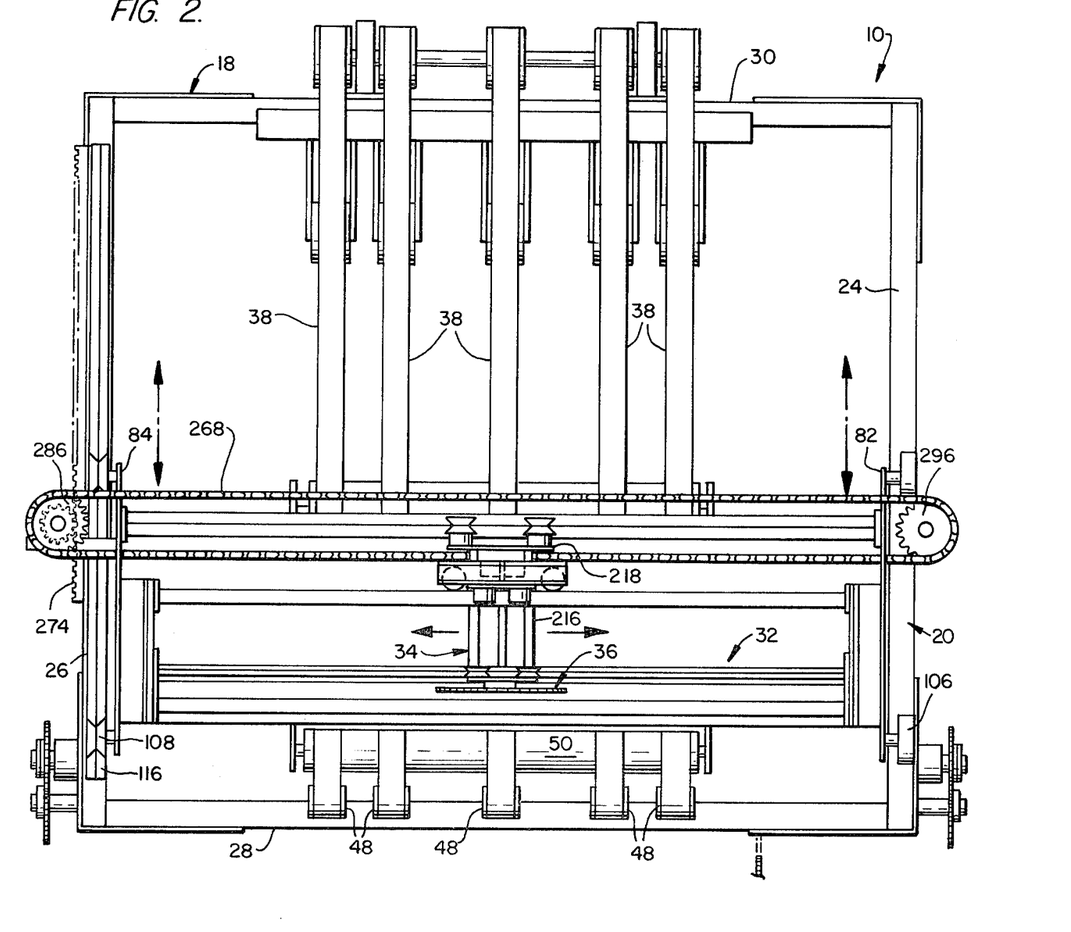
FIG. 2 is a top plan view of the flying saw apparatus.

Referring to the drawings wherein like numerals indicate like elements, there is illustrated a flying saw apparatus designated as generally as 10. As seen in FIG. 1, a length of material 12 moves in the linear direction of arrows 14. The material 12 enters the flying saw apparatus as a continuous sheet and is cut by the apparatus 10 into discrete panels 16 of a predetermined length. In a preferred embodiment, the material is comprised of a wood product such as plywood and the flying saw apparatus 10 is incorporated into the plywood layup line.

The flying saw apparatus is comprised of a main frame assembly 18 and a saw carriage 20. The main frame assembly 18 supports the apparatus 10 above the ground. The saw carriage 20 is supported on the main frame assembly 18 for reciprocating motion parallel to the direction of motion 14 of the material 12.

The main frame assembly 18 includes four vertically extending legs 22, a pair of side members 24, 26 and a pair of cross members 28, 30. Side member 24 extends between the upper ends of longitudinally spaced legs 22 on one transverse side of the apparatus 10, and side member 26 extends between the upper ends of longitudinally spaced legs 22 on the opposite side of the apparatus 10. Cross member 28 extends between the upper ends of transversely spaced legs 22 at an inlet end of the apparatus 10, and cross member 30 extends between the upper ends of transversely spaced legs 22 at the outlet end of the apparatus 10.

The saw carriage 20 includes a saw bridge 32 which extends between opposite transverse sides of the saw carriage 20. A saw shuttle 34 is connected to the saw bridge 32 so as to be movable along the length of the bridge 32, i.e., in the transverse direction. A circular saw 36 is carried by the saw shuttle 34.

The material 12 is carried through the flying saw apparatus 10 by a plurality of belts 38. The belts 38 are trained about rollers and cylinders carried by the main frame assembly 18 and the saw carriage 20. A plurality of rollers 40 are carried on a drive shaft 42. The drive shaft 42 is located at an inlet end of the apparatus 10 at a location below the level of the saw carriage 20. The drive shaft 42 is rotatably supported by the legs 22 at the inlet end. A drive sprocket 44 is attached to the drive shaft 42. Sprocket 44 is driven by a chain 68 which is received about a sprocket 70 on a common drive shaft 72. The shaft 72 is also rotatably supported by the legs 22 at the inlet end. See FIG. 3. A main drive chain 74 is received about a sprocket 76 on common drive shaft 72 and a sprocket 78 on a shaft 80. Shaft 80 is coupled to the drive power source of the belts (not shown) carrying the material to the apparatus 10 so as to coordinate the speed of the belts 38 to the preceeding belts. Shaft 80 may be supported by a portion of the layup line preceding the apparatus 10.

After passing about rollers 40, the belts 38 pass inwardly of a cylinder 46 and thereafter about rollers 48 to place belts 38 parallel to the plane of the moving material 12. The cylinder 46 is supported on a shaft which is carried by arms 47 extending downward from cross member 28. The rollers 48 are supported on a shaft 49 carried by the upper end of cross member 28. The belts 38 then pass around and extend downwardly from a cylinder 50 carried at the upper inlet end of the saw carriage 20. The belts 38 thereafter pass around a cylinder 52 at the lower inlet end of the saw carriage 20 and a cylinder 54 at the lower outlet end of the saw carriage. The belts 38 then passes upwardly to a cylinder 56 carried at the upper outlet end of the saw carriage, pass around the cylinder 56 to again run parallel to the plane of the moving material 12. Cylinders 50, 52, 54 and 56 thus function as a guide mechanism to guide the belts 38 downwardly below the saw carriage 20 and out of the path of the saw 36. Passing from the cylinder 56, the belts 38 extend around rollers 58 carried on a shaft 60 at the upper outlet end of the main frame assembly 18. The belts 38 then pass around a tensioning bar 62 carried on a pair of pivotable arms 64, each of which extends from a leg 22 at the outlet end of the apparatus 10. From the tensioning bar 62, the belts 38 pass around a cylinder 66 located directly above the rollers 44. The cylinder 66 is rotatably carried by a shaft supported by arms 67. The arms 67 are attached to a cross bar 69 which extends between and is attached to legs 22 at the inlet end of the apparatus 10. A closed loop path for the belts 38 is thus formed and the driving power for belts 38 is transferred from the primary material conveyor through drive shaft 42 and rollers 44.

Figure 5:
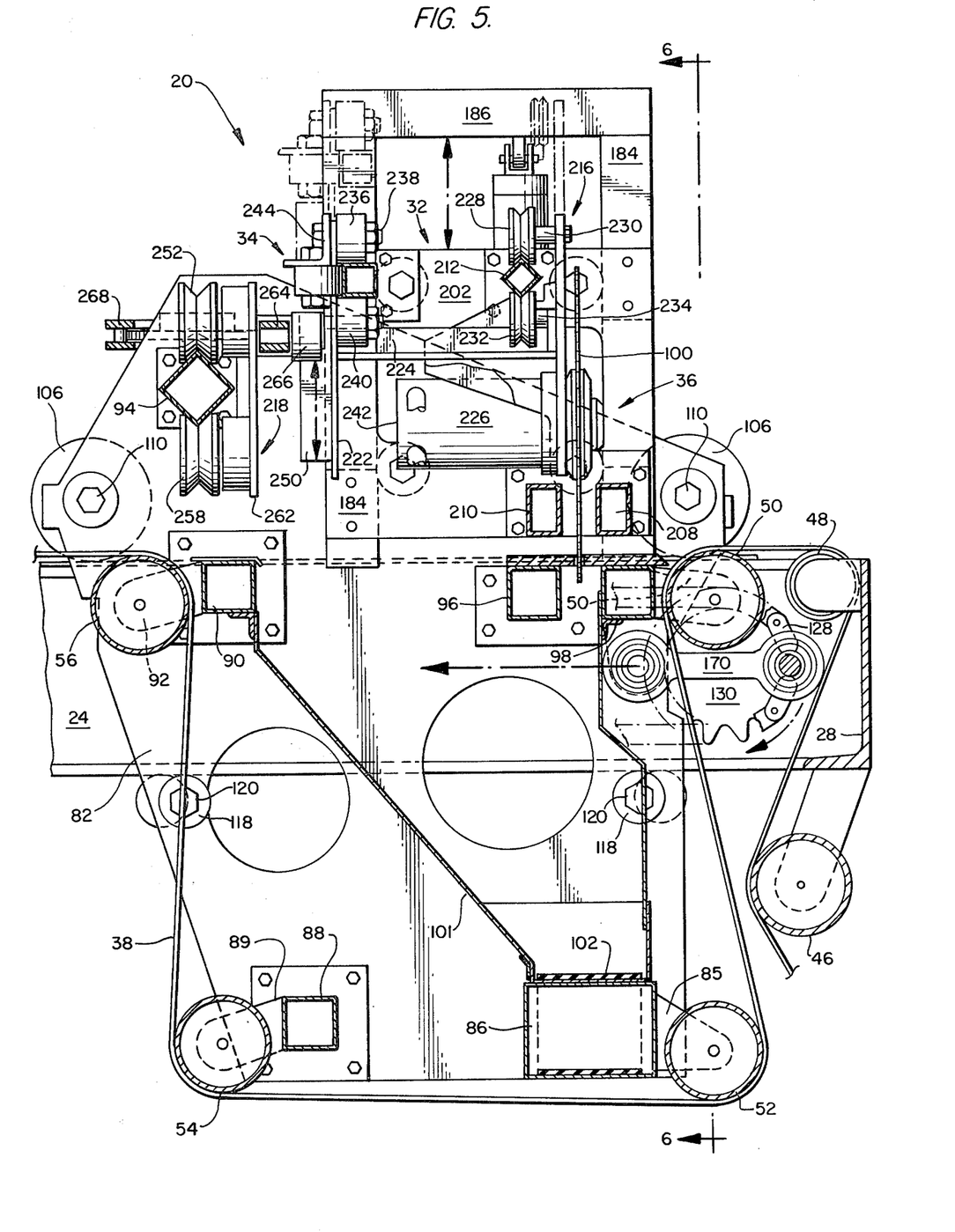
FIG. 5 is a sectional view taken generally along line 5—5 of FIG. 3.

The saw carriage 20 includes a pair of side plates 82, 84 at opposite transverse sides of the apparatus 10, connected to one another in the following manner. A first lower cross bar 86 extends between the side plates 82, 84 at the lower inlet end of saw carriage 20 and is attached to either plate 82, 84. The cylinder 52 is rotatably supported by a pair of arms 85 which extend forwardly from cross bar 86. A second lower cross bar 88 extends between the side plates 82, 84 adjacent the lower outlet end of saw carriage 20 and is attached to either plate 82, 84. The cylinder 54 is rotatably supported by a pair of arms 89 which extend rearwardly from cross bar 88. An outlet support bar 90 extends between side plates 82, 84 and is attached to either of the plates 82, 84. The support bar 90 is located at the outlet end of the saw carriage 20 and at a level immediately below the level of the material passing through the saw carriage to thereby form a support surface for the material. The cylinder 56 is rotatably supported by arms 92 extending from outlet support bar 90. A shuttle drive runner or rail 94 extends between the side plates 82, 84 and is attached to either plate 82, 84. The runner 94 is located adjacent the outlet end of the saw carriage 20 and above the outlet support bar 90. A pair of spaced parallel inlet support bars 96, 98 extend between the side plates 82, 84 and are attached to the plates 82, 84. The inlet support bars 96, 98 are located adjacent the inlet end of the saw carriage 20 and at a level immediately below the plane in which the material 12 travels. The space between the inlet support bars 96, 98 is sufficient to allow a blade 100 of the saw 86 to pass through. The cylinder 50 is rotatably supported by a pair of arms 99 which extend forwardly from support bar 98. A waste conveyor housing 101 also extends between the side plates 82, 84. The waste conveyor housing 101 has an open top and defines a dust collection bin within its interior. The housing 101 is attached to the lower cross bar 86, the outlet support bar 90 and the inlet support bar 98 (FIG. 5).

Figure 6:
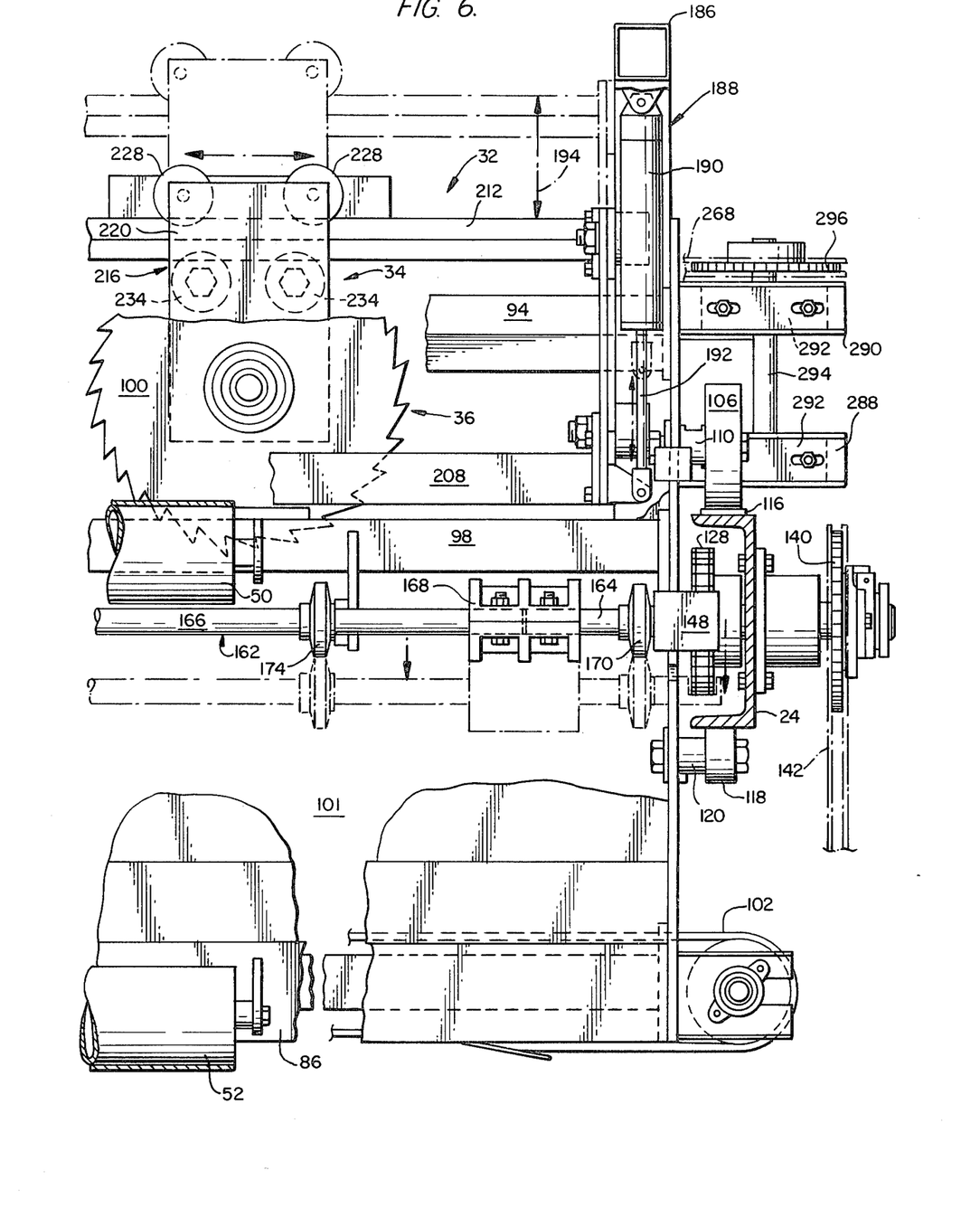
FIG. 6 is a view taken generally along line 6—6 of FIG. 5.

Dust, wood chips and other waste produced during the cutting operation is received within the interior of the housing 101 and carried therefrom by a conveyor belt 102. Conveyor belt 102 is carried about a pair of spaced rollers 103 (one of which is shown in FIG. 6). The rollers 103 are supported by the saw carriage 20 exteriorly of housing 106 on opposite transverse sides of the saw carriage 20. The top run of belt 102 is disposed along the bottom of housing 101 to carry waste therefrom, and the bottom run of belt 102 is partially below and partially within the hollow interior of lower cross bar 86 (FIG. 6). The conveyor belt 102 is driven by a hydraulic motor 104 which is attached to the outwardly facing surface of side plate 82 and is coupled to one of the rollers 103.

One side of the saw carriage 20 is supported on the main frame assembly 18 rollers 106 and the other side of the saw carriage 20 is supported on the main frame assembly 18 by rollers 108. Each roller 106 is rotatably attached to side plate 82 by an axle or pin assembly 110 and each roller 108 is rotatably attached to side plate 84 by an axle or pin assembly 112. Each roller 106 has a flat bearing surface and rides on a flat wear plate 114 carried on the upper surface of side member 24. Each roller 108 has a grooved bearing surface which rides on an angled wear plate 116 carried on the upper surface of side member 26. A pair of lower support rollers 118 are rotatably attached to side plate 82 by axle or pin assemblies 120. Rollers 118 are placed in rolling contact with the lower surface of side member 24. A similar pair of lower support rollers 122 are rotatably attached to the side plate 84 by axle or pin assemblies 124. Rollers 122 are placed in rolling contact with a lower surface of side member 26.

Figure 7:
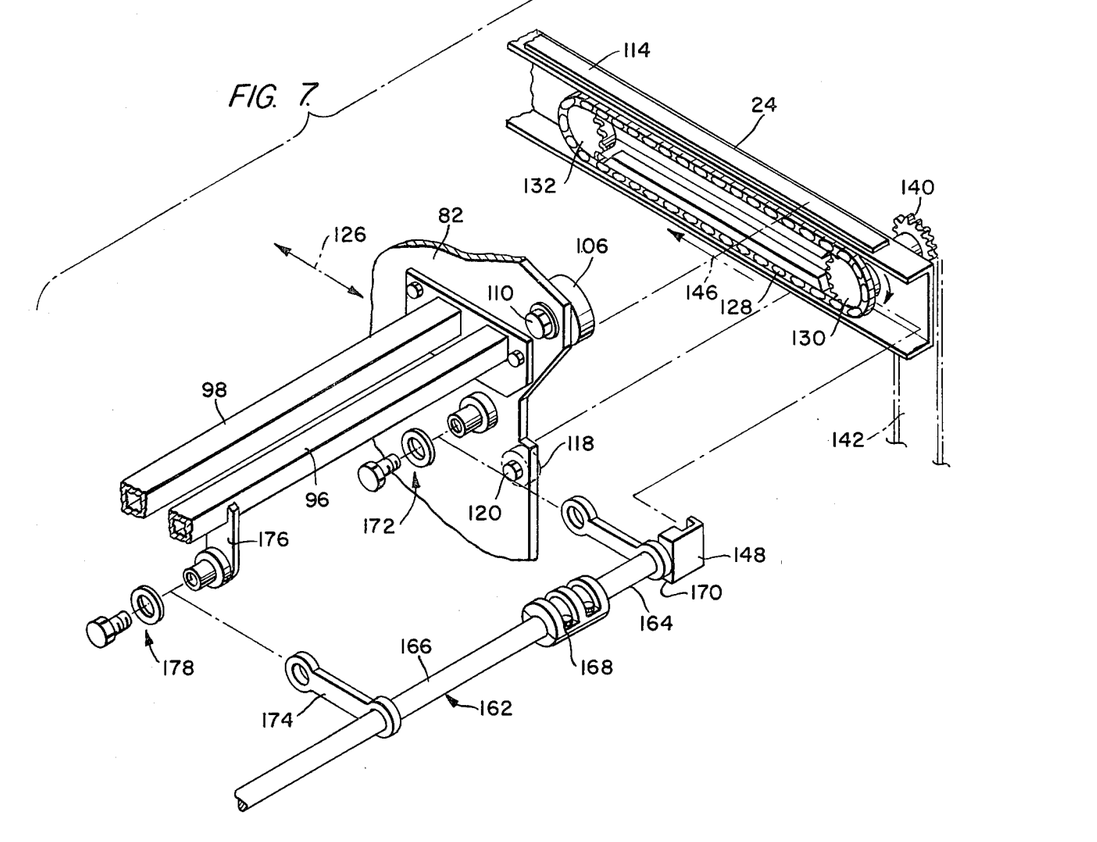
FIG. 7 is an exploded perspective view illustrating the connection of the saw carriage to a drive chain.

The drive mechanism for reciprocating saw carriage 20 in the direction shown by arrows 126 is best seen in FIG. 7. A carriage drive chain 128 is received about spaced sprockets 130, 132. The sprockets 130, 132 are carried by shafts 134, 136, which in turn are rotatably carried by a vertically extending surface of side member 24. A second sprocket 140 is also carried by the shaft 134. A connecting chain 142 is received about the sprocket 140 and a drive sprocket 144 attached to the common drive shaft 72 (FIG. 3). Power from the shaft 72 is thus transferred to the carriage drive chain 128. The carriage drive chain 128 is driven in a single direction indicated by arrow 146 in FIG. 7. The single direction travel of carriage drive chain 128 is converted into reciprocating motion of the saw carriage 20 by the manner in which the carriage 20 is coupled to the chain 128.

Figure 9:
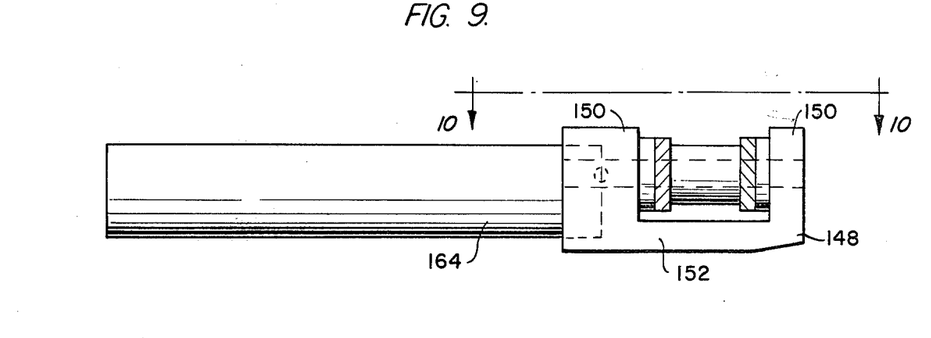
FIG. 9 is an enlarged end view, partially in section, illustrating the connection of the carriage to the drive chain.
Figure 10:
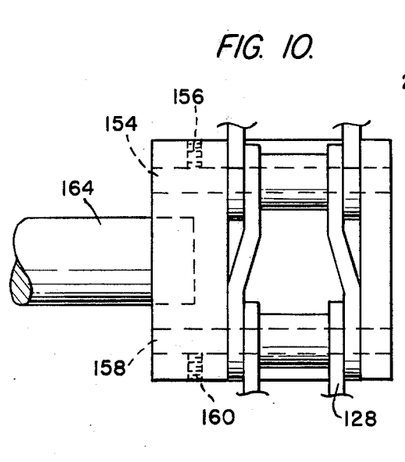
FIG. 10 is a view taken generally along line 10—10 of FIG. 9.

As best seen in FIGS. 9 and 10, a connecting block 148 is attached to several links of the carriage drive chain 128. The connecting block 148 is formed in the shape of a yoke having a pair of spaced arms 150 connected by a connecting member 152. A first pin 154 extends between first aligned holes in arms 150 and through connecting portions of adjacent links of the chain 128. The pin 154 is held in position by a set screw 156. Similarly, a second pin 158 extends through a second set of aligned holes in arms 150 and passes through connecting portions of adjacent links of the chain 128, and is held in position by a set screw 160. A like drive chain 128 is supported about sprockets 130, 132 carried by side member 26 on the opposite transverse side of the saw carriage 20 and a similar connecting block 148 is attached thereto. The drive chain 128 supported on side member 26 is also connected to drive shaft 72. A sectional tow bar member 162 is connected to and extends between the opposing connecting blocks 148. The tow bar member 162 is pivotably coupled to the saw carriage 20. The tow bar member 162 includes outer rod sections 164, each connected to opposite connecting blocks 148, and a central rod 166. Outer rods 164 are joined to the central rod 166 by coupling blocks 168. A connecting link 170 has its first end received about outer rod 164 and its second end pivotably coupled to the side plate 82 of the saw carriage 20 by a pin assembly 172. A similar connecting link 170 couples the other outer rod 164 to side plate 84. Center rod 166 is pivotably coupled to support bar 96 by similar connecting links 174 (one of which is shown in FIG. 7) having their first ends received about center rod 166 and their second ends coupled to arms 176 through pin assemblies 178.

Figure 8:
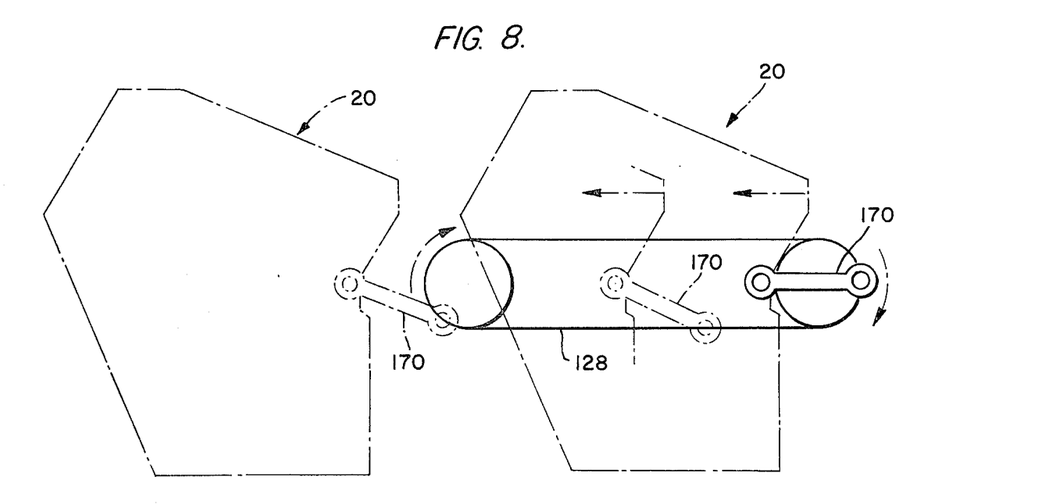
FIG. 8 is a schematic side view illustrating the drive of the saw carriage by the drive chain.

Through the connection described above, the saw carriage reciprocates back and forth parallel to the direction of motion of the material 12 in the manner illustrated in FIG. 8. With the end of the links 170, 174 moving along the bottom run of the carriage drive chain 128, the saw carriage 20 moves in a right to left direction as seen in FIG. 8. As the links 170, 174 pivot upwardly to move along the top run of the carriage drive chain 128, the saw carriage 20 changes its direction of motion and begins to travel left to right as seen in FIG. 8.

Figure 12:
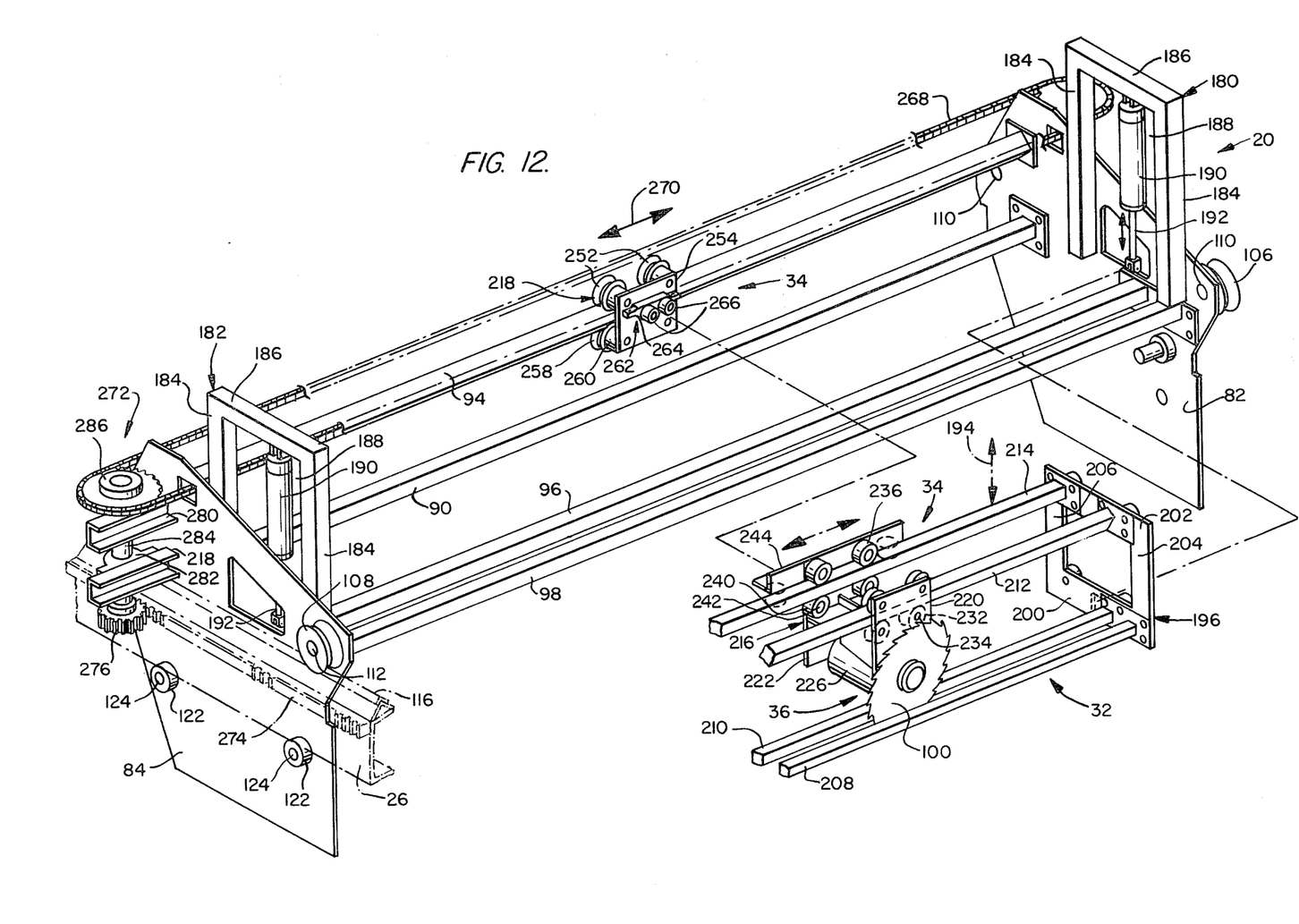
FIG. 12 is an exploded perspective view illustrating the saw carriage, saw bridge and saw shuttle.
Figure 13:
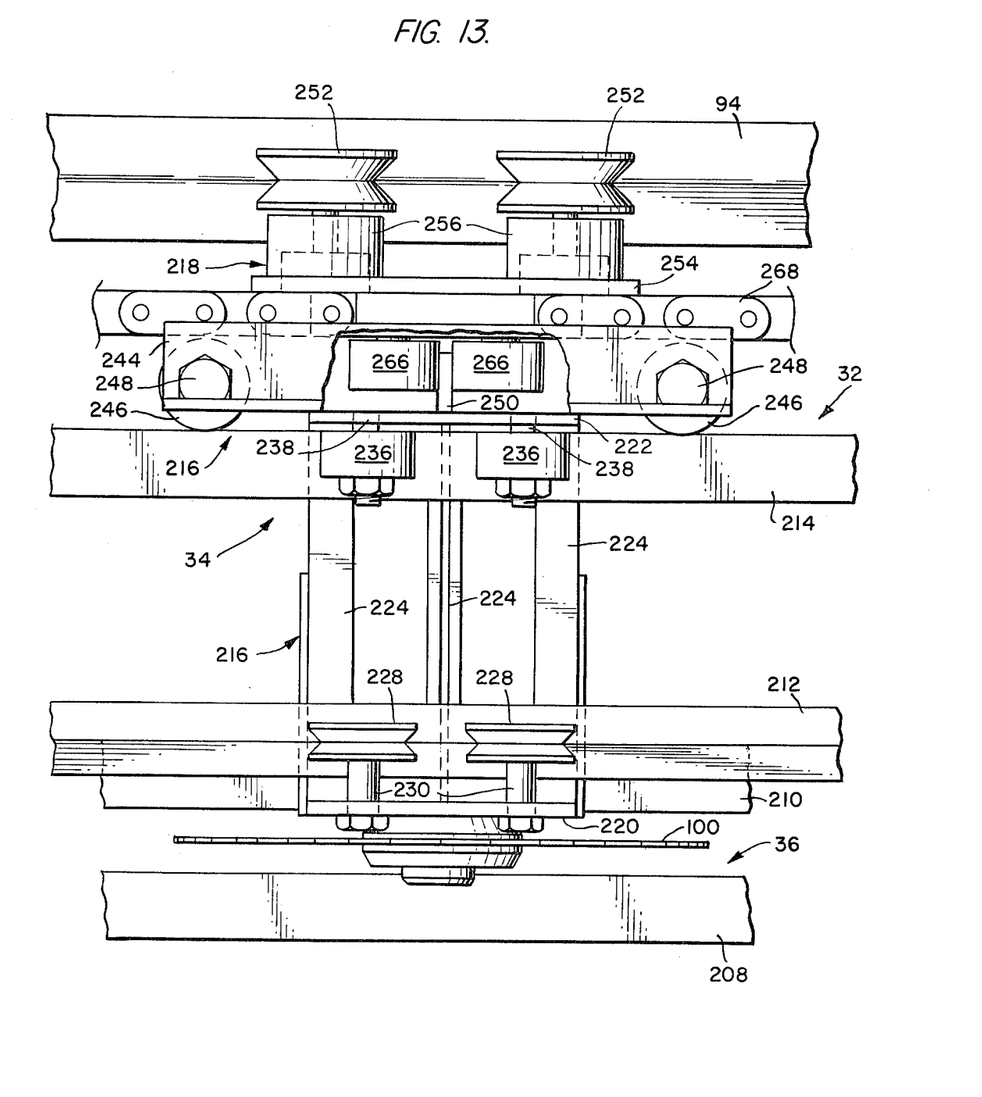
FIG. 13 is a view taken generally along line 13—13 of FIG. 3.

The saw carriage 20 includes a saw bridge support assembly. The saw bridge support assembly includes an inverted U-shaped frame 180 attached to side plate 82 and a similar inverted U-shaped frame 182 attached to side plate 84 (FIG. 12). Each frame 180, 182 includes a pair of spaced upwardly extending legs 184 attached to an inner surface of a respective side plate 82, 84 and connected by a generally horizontal member 186. A hydraulically actuated piston-cylinder mechanism 188 is pivotably suspended from each horizontal member 186. Each mechanism 188 includes a cylinder 190 pivotably connected to a horizontal member 186 and a piston rod 192 extending from the cylinder 190. Each piston rod 192 is pivotably connected to the saw bridge 32. Thus, the actuation of the piston-cylinder mechanisms 188 moves the saw bridge 32 upwardly and downwardly as indicated by arrows 194.

Figure 11:
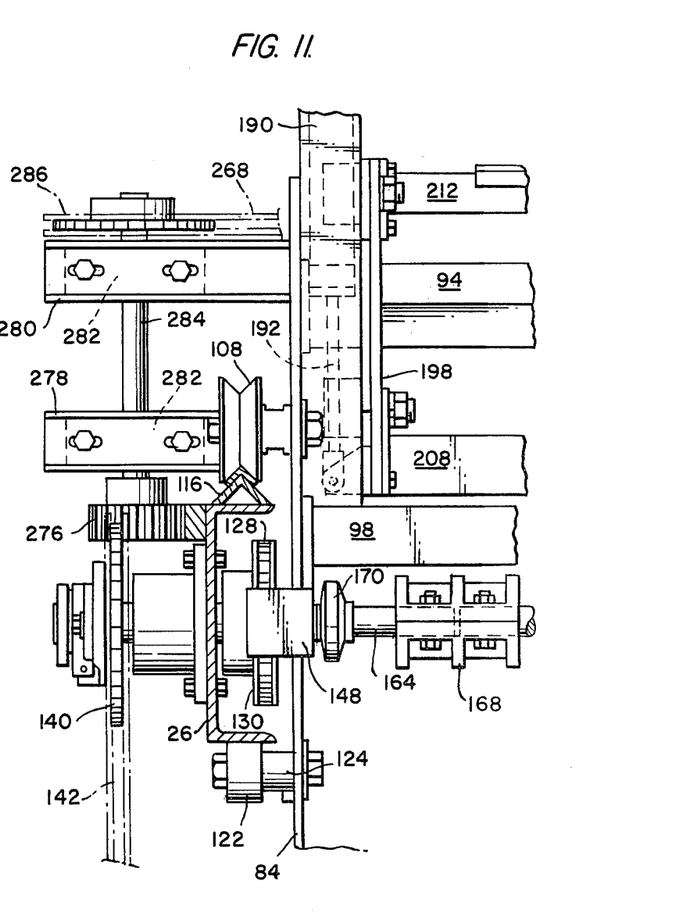
FIG. 11 is an end view of one side of the flying saw apparatus.

Saw bridge 32 includes a side frame 196 connected to the inverted U-shape frame 180 through one of the hydraulic piston-cylinder mechanisms 188, and a side frame 198 (FIG. 11) connected to inverted U-shaped frame 182 through the other hydraulic piston-cylinder mechanism 188. Side frames 196, 198 have an open rectangular configuration. Each side frame 196, 198 is comprised of a lower plate 200 and an upper plate 202 connected by spaced parallel upright plates 204, 206. A pair of spaced parallel clamp down bars 208, 210 extend between the side frames 196, 198 and are attached to oppostie lower plates 200. Saw blade 100 is disposed in the space between the clamp down bars 208, 210. A pair of spaced parallel saw shuttle runners 212, 214 extend between side frames 196, 198 and are attached to opposite upper plates 202.

The saw shuttle 34 includes a saw carrying frame 216 and a drive frame or trolley 218. The saw carrying frame 216 is movably supported on runners 212, 214 and the drive trolley 218 is movably supported on the runner 94. The saw carrying frame 216 includes a front plate 220, a back plate 222 and connecting bars 224 connecting the front and back plates 220, 222. Saw 36, including saw blade 100 and a hydraulic drive motor 226, is attached to the front plate 220.

Runner 212 has a square cross-section and is positioned so that one corner of the square faces upwardly and another corner faces downwardly. A pair of grooved upper rollers 228 are rotatably connected to front plate 220 by pin assemblies 230, and are located above runner 212 in a position such that the grooves of the rollers 228 ride along the upper corner of runner 212. Similar grooved lower rollers 232 are rotatably supported by pin assemblies 234 attached to front plate 220. Grooved lower rollers 232 are located below runner 212 in a position so that the grooves of the rollers 232 engage the lower corner of runner 212. Back plate 222 is movably supported on runner 214 by a pair of top rollers 236 rotatably attached to back plate 222 by pin assemblies 238. Top rollers 236 have flat circumferential surfaces and are in rolling contact with a flat upper surface of runner 214. A pair of bottom rollers 240 are rotatably attached to back plate 222 by pin assemblies 242 and are in the rolling contact with a bottom flat surface of runner 214. An angle bracket 244 is attached to the back surface of back plate 222 at its upper end. A pair of back rollers 246 are rotatably supported by a horizontal surface of angle bracket 244 for rotation about generally vertical axes of pin assemblies 248. The rollers 246 are in rolling contact with a rear vertical surface of runner 214. A coupling plate 250 extends rearwardly and vertically from the back surface of back plate 222 at a location below angled bracket 244. Carrying frame 216 is thus supported for both horizontal motion along runners 212, 214 and for vertical motion together with the entire saw bridge 32.

Drive power in the horizontal direction is imparted to the saw carrying frame 216 from the drive trolley 218. Drive trolley 218 is horizontally movable along shuttle drive runner 94 which is located at a fixed vertical location by its attachment to side plates 82, 84. Shuttle drive runner 94 has a square configuration and is placed in a disposition such that one corner of the square faces upwardly and another corner of the square faces downwardly. A pair of top grooved rollers 252 are rotatably attached to a vertically extending support plate 254 of drive trolley 218 by pin assemblies 256. The upwardly facing corner of runner 94 is received within the grooves of top rollers 252. Similarly, a pair of bottom grooved rollers 258 are rotatably supported on plate 254 by pin assemblies 260. The downwardly facing corner of runner 94 is received within the grooves of the bottom rollers 258. A coupling assembly 262 is attached to the forwardly facing surface of support plate 254 and includes a support bracket 264 and a pair of rotatable cam rollers 266. Cam rollers 266 are placed adjacent to one another with a gap between their outer circumferential surfaces sufficient to receive coupling plate 250. Drive trolley 218 is thus coupled to saw carrying frame 216 in such a manner that the driving coupling remains irrespective of the upward and downward motion of the saw bridge 32. Plate 250 has a sufficient vertical extent to accomplish this continuous coupling.

The drive trolley 218 is fixed to a portion of an endless shuttle drive chain 268. The shuttle drive chain 268 and, hence, the shuttle 34 are movable in two horizontal directions as shown by arrows 270. The chain 268 is driven by a rack and pinion mechanism 272 comprised of a rack 274 and a pinion 276. The rack and pinion mechanism 272, in turn, receives its driving power from the reciprocating motion of the saw carriage 20. The rack 274 is attached to a vertical surface of side member 26 so that the teeth of the rack 274 extend horizontally and face outwardly. A pair of support brackets 278, 280 extend generally horizontally from an outwardly facing surface of side plate 84. A bearing block 282 is attached to each support bracket 278, 280. A drive shaft 284 is rotatably carried in the bearing blocks 282 and extends generally vertically. Pinion 276 is attached to a lower end of the drive shaft 284, is rotatable with the shaft 284 about its vertical axis and meshes with the teeth of rack 274. A drive sprocket or pulley 286 is attached to the upper end of drive shaft 284 for rotation therewith. Shuttle drive chain 268 is received about the drive pulley 286.

On the opposite transverse side of the saw carriage 20, support brackets 288, 290 horizontally from the outer surface of the side plate 82. A bearing block 292 is attached to each support bracket 288, 290 and a shaft 294 is rotatably supported by the bearing blocks 292. A driven sprocket 296 is attached to the upper end of the shaft 294 for rotation therewith. The shuttle drive chain 268 is received about the driven sprocket 296. As the saw carriage 20 is driven in a first direction, i.e., in the same direction of motion as the material 12, pinion 276 rotates in a first direction so that shuttle drive chain 268 moves the saw shuttle 34 from a first side of the saw carriage 20 to a second side thereof. During this motion, the saw bridge is in its lowermost position so that saw 36 cuts through the material 12. In its lowermost position, the material 12 is clamped between support bars 96, 98 and clamp down bars 208, 210. As the saw carriage 20 moves in the opposite direction i.e., opposite to the direction of motion of the material 12, the pinion 276 rotates in an opposite direction to move the saw shuttle 34 from the second side of the saw carriage to the first side. During the motion of the saw shuttle 34 from the second side of the saw carriage 20 to its first side, the saw bridge 32 is in its uppermost position so that the saw blade 100 is disposed above the material 12.

For safety purposes, some exposed portions of the chains, support rollers 106, 108 and sprockets can be covered with removable guard housings (not shown).

The flying saw apparatus 10 operates in the following manner. While no material is moving into the flying saw apparatus 10, the hydraulic motor 226 of saw 36 is activated to begin the rotation of saw blade 100, a hydraulic system for actuating the piston-cylinder mechanisms 188 is activated and the hydraulic motor 104 of the waste conveyor is activated. The material 12 begins to move toward the flying saw apparatus 10. As the material 12 reaches a fixed point, a signal raises the saw bridge 32, and, hence, raises the saw 36 and the clamp down bars 208, 210. The saw carriage 20 and saw 36 move to the starting point as the leading edge of the material 12 moves to the starting point. Simultaneously, as the leading edge of the material 12 reaches the starting point, the saw 36 and clamp down bars 208, 210 drop to the cutting plane level by the activation of the hydraulic piston-cylinder mechanisms 188 which lowers the entire saw bridge 32. The saw carriage 20 travels in unison with the material 12 through the drive of chain 128 which is coupled to the driving power of the primary material conveyor. The speed of the material 12 through the apparatus 10 is thus coordinated to the speed of the material on the primary conveyor. The longitudinal motion of the saw carriage 20 is transferred as transverse motion of the saw 36 through the rack and pinion mechanism 272 connected to the saw shuttle 34 through chain 268, the saw 36 thus cuts transversely through the material 12. In a typical cutting operation, while the saw carriage 20 moves approximately 38 inches, the saw 36 travels 72 inches making a cut. As the saw bridge 32 and saw 36 reach the end of their forward travel, a signal activates the hydraulic piston-cylinder mechanisms 188 to lift the saw bridge 32 and saw 36 above the cutting plane. The material 12 continues to move forward, and while the last half of the material 12 travels under the saw bridge 32. The saw carriage 20 returns to the starting position, arriving just as the end of the first piece of material to be cut and the leading edge of the next piece of material to be cut arrive at the start position. The functions are then automatically repeated. The activation of the piston-cylinders 188 and the hydraulic motors 104, 226 are accomplished by conventional hydraulic circuits and conventional signaling devices.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim:

1. A flying saw apparatus for severing a predetermined length of material from a continuously moving length of the material comprising:
   a main frame assembly;
   a saw carriage including a saw bridge extending transversely of the direction of motion of the material, said saw carriage being supported by said frame assembly for reciprocating motion parallel to the direction of motion of the material to be severed;
   a saw shuttle connected to said saw bridge for reciprocating motion transverse to the direction of motion of said saw carriage;
   a saw, having a saw blade, carried by said saw shuttle;
   carriage drive means for driving said saw carriage in its reciprocating motion;
   means for coupling said carriage drive means to the drive mechanism of the moving length of material to coordinate the motion of the length of material to the motion of said saw carriage;
   shuttle drive means for moving said saw shuttle in its reciprocating motion, said shuttle drive means including a fixed rack extending in the direction of motion of said saw carriage, a pinion rotatably carried by said saw carriage in meshing engagement with said rack, and means for drivingly connecting said pinion to said saw shuttle whereby the reciprocal motion of said saw carriage is transferred into the reciprocal motion of said saw shuttle along the length of said saw bridge.

2. A flying saw apparatus in accordance with claim 1 wherein said rack is attached to and extends along one side of said main frame assembly.

3. A flying saw in accordance with claim 2 wherein said rack includes teeth extending generally horizontally and said pinion is rotatable about a generally vertical axis.

4. A flying saw in accordance with claim 3 wherein said means connecting said pinion to said saw shuttle includes an endless chain driven by said pinion, said saw shuttle being fixed to a portion of said endless chain.

5. A flying saw apparatus in accordance with claim 4 wherein said connecting means includes first and second rods rotatably supported by said carriage about vertical axes on opposite transverse sides of said carriage, said pinion and a drive sprocket being attached to said first rod, and a driven sprocket being attached to said second rod, said endless chain being trained about said drive and driven sprockets with said saw shuttle being disposed between said drive and driven sprockets.

6. A flying saw apparatus in accordance with claim 1 including belt means carried by said main frame assembly for contacting a bottom surface of the material to be severed and moving the material parallel to the direction of motion of said saw carriage, said saw carriage including guide means for guiding said belt means downwardly out of contact with the material in the area of said saw, said saw being disposed above said material and said being saw blade movable downwardly through said material, whereby said guide means places said belt means out of the path of said saw blade when it cuts through the material.

7. A flying saw apparatus in accordance with claim 6 wherein said saw carriage includes a saw bridge support frame extending upwardly above said belt means on either transverse side of said saw carriage, said saw bridge connected to said support frame by actuator means for moving said saw bridge upwardly and downwardly between a cutting position in which said saw blade extends through the material to thereby cut the material and a return position in which the saw blade is disposed above the material.

8. A flying saw apparatus in accordance with claim 7 wherein said saw bridge includes transverse runners for supporting said saw shuttle for its reciprocating motion, and at least one transverse clamp down bar for clamping down on top of the material to be severed.

9. A flying saw apparatus in accordance with claim 8 wherein said saw carriage includes a pair of transversely extending spaced-parallel support bars below the material to be severed, and wherein said at least one clamp down bar includes a pair of spaced parallel clamp down bars extending generally above said support bars whereby said material to be severed is clamped between said support bars and said clamp down bars and said saw blade passes between the space between said clamp down bars and the space between said support bars.

10. A flying saw apparatus in accordance with claim 8 wherein said means connecting said pinion to said saw shuttle includes an endless chain driven by said pinion and wherein said saw shuttle includes a saw carrying frame movably supported on said runners and a driving frame attached to a portion of said endless chain and coupled to said saw carrying frame to permit upward and downward motion of said saw carrying frame relative to said driving frame.

11. A flying saw apparatus in accordance with claim 10 wherein said driving frame is comprised of a drive trolley supported for transverse motion by a rail extending between and connected to opposite sides of said saw carriage, said carrying frame and said drive trolley being coupled to one another by a vertically extending plate and a pair of cam rollers, said vertically extending plate extending from one of said drive trolley and carrying frame, and said pair of cam rollers supported by the other of said drive trolley and carrying frame, said vertically extending plate being located between said cam rollers whereby the transverse motion of said drive trolley is transmitted to said carrying frame while vertical motion of said saw bridge relative to said drive trolley is permitted by the relative vertical motion between said vertically extending plate and said cam rollers.

12. A flying saw apparatus in accordance with claim 11 wherein said carrying frame includes first and second carrying plates on opposite longitudinal sides of said carrying frame and a cross bar attached to and extending between the first and second carrying plates, a first set of rollers carried by said first carrying plate for rolling contact with a first of said runners and a second set of rollers carried by said second carrying plate for rolling contact with a second of said runners, said saw being attached to at least one of said first and second carrying plates.

13. A flying saw apparatus in accordance with claim 1 or 6 wherein said carriage drive means includes a pair of sprockets and a main drive chain trained around said sprockets on each side of said apparatus, one pair of said sprockets being rotatably supported at locations spaced in the direction of travel of said carriage on a first side member of said main frame assembly, the other pair of said sprockets being rotatably supported at locations spaced in the direction of travel of said carriage on a second side member of said main frame assembly, coupling means for coupling said main drive chain to said carriage whereby the driving of said main drive chain in one direction reciprocates said carriage.

14. A flying saw apparatus in accordance with claim 13 wherein said coupling means includes a coupling block fixed to each of said main drive chains and a tow bar member extending transversely between opposite sides of said carriage and connected to said coupling blocks, said tow bar member being pivotably coupled at a plurality of locations to said saw carriage.

15. A flying saw apparatus in accordance with claim 14 wherein said saw carriage includes a carriage side plate on either transverse side and at least one support bar for supporting a bottom surface of the material being severed during the cutting operation, said at least one support bar extending between and being connected to said carriage side plates, said tow bar member being pivotably connected to each of said carriage side plates.

16. A flying saw apparatus in accordance with claim 1 including waste conveyor means for collecting and conveying away from said carriage waste material produced by the cutting operation, said conveyor means being supported by said saw carriage below said saw bridge.

17. A flying saw apparatus in accordance with claim 16 wherein said waste conveyor means is comprised of a waste conveyor housing for confining the waste produced during cutting, an endless conveyor belt extending between opposite sides of said saw carriage, and belt drive means for driving said conveyor belt to carry said waste to a side of said saw carriage.

18. A flying saw apparatus for severing a predetermined length of material from a continuously moving length of material comprising;
 a main frame assembly;
 a saw carriage including a saw bridge extending transversely of the direction of motion of the material, said saw carriage being supported by said frame assembly for reciprocating motion parallel to the direction of motion of the material;

a saw shuttle connected to said saw bridge for reciprocating motion transverse to the direction of motion of said saw carriage;

a saw, having a saw blade, carried by said saw shuttle;

carriage drive means for driving said saw carriage in its reciprocating motion;

means for coupling said carriage drive means to the drive mechanism of the moving length of material to coordinate the motion of the length of material to the motion of said saw carriage;

shuttle drive means for moving said saw shuttle in its reciprocating motion, said shuttle drive means including a rack extending in the direction of motion of the material to be severed and attached to a side member of said main frame assembly, a pinion rotatably carried by said saw carriage in meshing engagement with said rack and a shuttle drive chain coupling said saw shuttle to said pinion;

said saw bridge including at least one material clamping bar extending transversely for clamping down on the material to be cut adjacent the path of said saw blade;

actuator means for moving said saw bridge, including said at least one material clamping bar, and the saw in unison upwardly and downwardly; and said saw carriage including a saw bridge support frame extending upwardly above the level of the moving material on either side of said saw carriage, said saw bridge including a side frame adjacent each side of said saw bridge support frame, said side frames being connected to one another by transverse members including said at least one clamping bar, said actuator means including a piston-cylinder mechanism connected between each adjacently disposed saw bridge support frame and side frame.

19. A flying saw apparatus in accordance with claim 18 wherein said saw carriage includes a pair of spaced-parallel support bars attached to and extending between opposite transverse side plates of said saw carriage at a level immediately below the level of the material passing through the apparatus, said saw bridge transverse members including a pair of said clamping bars in a spaced parallel relationship above said support bars, said saw blade being disposed within the space between said clamping bars and passing in the space between said support plates when said saw bridge is lowered to place said saw blade in a cutting position.

20. A flying saw apparatus in accordance with claim 18 wherein said saw shuttle includes a saw carrying frame, a drive trolley, and means for coupling said saw carrying frame to said drive trolley, said transverse members of said saw bridge including first runner means for supporting said saw carrying frame and said saw carriage including second runner means for supporting said drive trolley at a fixed horizontal level, said drive trolley being connected to said shuttle drive means, and said means for coupling said saw carrying frame to said drive trolley permitting said saw carrying frame to move vertically with said saw bridge while remaining coupled to said drive trolley and being moved horizontally thereby.

21. A flying saw mechanism in accordance with claim 20 wherein said first runner means includes first and second spaced parallel runners extending between and attached to said side frames, said saw carrying frame including first and second carrying plates, said saw being attached to at least one of said first and second carrying plates, a first set of rollers rotatably carried by said first carrying plate and coupled to said first runner for rolling motion therealong, a second set of rollers rotatably carried by said second carrying plate and coupled to said second runner for rolling motion therealong, said second runner means including at least one trolley runner extending between and attached to opposite side plates of said saw carriage, a third set of rollers rotatably carried by said saw rollers and coupled to said trolley runner for rolling motion therealong.

22. A flying saw apparatus in accordance with claim 21 wherein said first set of rollers includes a pair of rollers for rolling contact with an upper surface of said first runner and a second pair of rollers for rolling contact with a lower surface of said second runner, said second set of rollers including a first pair of rollers for rolling contact with an upper surface of said second runner, a second pair of rollers for rolling contact with a lower surface of said second runner and a third pair of rollers for rolling contact with a side surface of said second runner.

23. A flying saw apparatus in accordance with claim 20, 23 or 22 wherein said means for coupling said saw carrying frame to said drive trolley includes a vertically extending plate extending from one of said drive trolley and saw carrying frame and a pair of cam rollers supported by the other of said drive trolley and saw carrying frame, said vertically extending plate being located between said cam rollers whereby the transverse motion of said drive trolley is transmitted to said saw carrying frames while vertical motion of said saw bridge relative to said drive trolley is permitted by relative vertical motion between said vertically extending plate and said cam rollers.

24. A flying saw apparatus in accordance with claim 18 or 19 including belt means carried by said main frame assembly for contacting a bottom surface of the material to be severed and moving the material parallel to the direction of motion of said saw carriage, said saw carriage including guide means for guiding said belt means downwardly out of contact with the material in the area of said saw, said saw being disposed above said material and having a saw blade movable downwardly through said material whereby said guide means places said belt means out of the path of said blade when it cuts through the material.

25. A flying saw apparatus in accordance with claim 24 wherein said carriage drive means includes a pair of sprockets and a main drive chain trained around said sprockets on each side of said apparatus, one pair of said sprockets being rotatably supported at locations spaced in the direction of travel of said carriage on a first side member of said main frame assembly, the other pair of said sprockets being rotatably supported at locations spaced in the direction of travel of said carriage on a second side member of said main frame assembly, coupling means for coupling said main drive chain to said carriage whereby the driving of said main drive chain in one direction reciprocates said carriage.

26. A flying saw apparatus in accordance with chain 25 wherein said coupling means includes a coupling block fixed to each of said main drive chains and a tow bar member extending transversely between opposite sides of said carriage and connected to said coupling blocks, said tow bar member being pivotably coupled at a plurality of locations to said saw carriage.

27. A flying saw apparatus in accordance with claim 18 or 19 including waste conveyor means for collecting and conveying away from said carriage waste material produced by the cutting operation, said conveyor means being supported by said saw carriage below said saw bridge.

28. A flying saw apparatus in accordance with claim 27 wherein said waste conveyor means is comprised of a waste conveyor housing for confining the waste produced during cutting, an endless conveyor belt extending between opposite sides of said saw carriage, and belt drive means for driving said conveyor belt to carry said waste to a side of said saw carriage.

29. A flying saw apparatus for severing a predetermined length of material from a continuously moving length of the material comprising:
a main frame assembly;
a saw carriage including a saw bridge extending transversely of the direction of motion of the material, said saw carriage being supported by said main frame assembly for reciprocating motion parallel to the direction of motion of the material to be severed;
a saw shuttle connected to said saw bridge for reciprocating motion transverse to the direction of motion of said saw carriage;
a saw carried by said saw shuttle;
carriage drive means for driving said saw carriage in its reciprocating motion;
means for coupling said carriage drive means to the drive mechanism of the moving length of material to coordinate the motion of the length of material to the motion of said saw carriage;
shuttle drive means for moving said saw shuttle in its reciprocating motion, said shuttle drive means including a fixed rack extending in the direction of motion of said saw carriage, a pinion rotatably carried by said saw carriage in meshing engagement with said rack, and means for drivingly connecting said pinion to said saw shuttle whereby the reciprocal motion of said saw carriage is transfered into the reciprocal motion of said saw shuttle along the length of said saw bridge;
said saw bridge including at least one material clamping bar extending transversely for clamping down on the material to be cut adjacent the path of the saw; and
actuator means for moving said saw bridge, including said at least one clamping bar and said saw, in unison upwardly and downwardly.

30. A flying saw apparatus for severing a predetermined length of material from a continuously moving length of the material comprising:
a main frame assembly for supporting the apparatus on a support surface;
a saw carriage supported by said main frame assembly for reciprocating motion parallel to the direction of motion of the material, said saw carriage including a side plate on either transverse side of the apparatus and a plurality of cross members extending between and attached to said saw carriage;
said saw carriage including a saw bridge, said saw bridge having a side frame interconnected by a pair of spaced parallel runners and a pair of spaced parallel clamping bars;
a saw shuttle including a saw carrying frame supported from reciprocal transverse motion by the runners of said saw bridge, a drive trolley supported for reciprocal transverse motion by one of the cross members of said saw carriage, and means for coupling said drive trolley to said saw carrying frame to transfer the transverse motion of said drive trolley to said saw carrying frame while permitting relative vertical motion between said drive trolley and said saw carrying frame;
a saw carried by said saw carrying frame, said saw having a saw blade extending into the space between said clamping bars;
carriage drive means for driving said saw carriage in its reciprocating motion;
means for coupling said carriage drive means to the drive mechanism of the moving length of material to coordinate the motion of the length of material to the motion of said saw carriage;
shuttle drive means for moving said saw shuttle in its reciprocating motion, said shuttle drive means including a rack attached to a side member of said main frame assembly and extending in the direction of motion of said saw carriage, a pinion rotatably carried by said saw carriage in meshing engagement with said rack, and a saw shuttle drive chain trained about sprockets on opposite transverse sides of said saw carriage and drivingly coupled to said pinion, said drive trolley being fixed to a portion of said saw shuttle drive train;
a piston-cylinder actuator mechanism attached to either side of said saw carriage for raising and lowering said saw bridge, said clamping bars of said saw bridge being disposed above a pair of said cross members of said saw carriage, said pair of cross members being disposed in a spaced parallel relationship whereby when said saw bridge is lowered the material to be severed is clamped between said clamping bars and said pair of cross members and said saw blade extends into the space between said pair of cross members.

* * * * *